United States Patent [19]
Hammond

[11] Patent Number: 5,415,245
[45] Date of Patent: May 16, 1995

[54] DRIVE SYSTEM FOR EFFICIENT VEHICLE PROPULSION

[76] Inventor: William M. Hammond, 2198 Tuscarora Trail, Maitland, Fla. 32751

[21] Appl. No.: 972,239

[22] Filed: Nov. 5, 1992

[51] Int. Cl.$^6$ .............................................. B60K 1/00
[52] U.S. Cl. .................... 180/165; 180/65.4
[58] Field of Search .................. 180/165, 65.2, 65.4, 180/69.6; 290/9, 10, 11, 12, 17, 18, 19, 21; 318/153, 154, 156

[56] References Cited

U.S. PATENT DOCUMENTS

| | | | |
|---|---|---|---|
| 3,515,968 | 6/1970 | Crawford | 180/65.4 |
| 3,659,672 | 5/1972 | Jacobus | 180/65.4 |
| 3,719,881 | 3/1973 | Shibata et al. | 180/65.4 |
| 3,732,751 | 5/1973 | Berman et al. | 290/16 |
| 3,858,674 | 1/1975 | Tabor | 180/165 |
| 3,870,116 | 3/1975 | Seliber | 180/165 |
| 3,882,750 | 5/1975 | Strohlein | 180/165 |
| 3,923,115 | 12/1975 | Helling | 180/165 |
| 3,994,354 | 11/1976 | Haumaier | 180/65.4 |
| 4,109,743 | 8/1978 | Brusaglino et al. | 180/65.4 |
| 4,126,200 | 11/1978 | Miller et al. | 74/751 |
| 4,131,171 | 12/1978 | Keyes | 60/709 |
| 4,218,624 | 8/1980 | Schiavone | 290/45 |
| 4,309,620 | 1/1982 | Bock | 290/17 |
| 4,393,964 | 7/1983 | Kemper | 192/3.58 |
| 4,588,040 | 5/1986 | Albright, Jr. et al. | 180/165 |

*Primary Examiner*—Richard M. Camby
*Attorney, Agent, or Firm*—Winstead Sechrest & Minick

[57] ABSTRACT

A vehicle drive system which consists of a piston engine prime power source combined with a high inertia acyclic generator used in conjunction with a D.C. motor to provide a bi-directional variable speed transmission of power between the load and the energy source. Sufficient energy accumulates in the inertia of the generator rotor to provide intermittent quantities of energy for acceleration of the vehicle. In this manner, highly efficient engines not presently suitable for use in vehicle propulsion can be utilized as well as the recouping of kinetic energy (regenerative braking) usually lost in heat dissipation by the friction brakes.

19 Claims, 4 Drawing Sheets

DRIVE SYSTEM FOR EFFICIENT VEHICLE PROPULSION

TECHNICAL FIELD OF THE INVENTION

The present invention is directed in general to variable-speed vehicle drive systems and, in particular, to such systems which employ an "on-off" power source and a power storage device to regulate power delivered from the source.

BACKGROUND OF THE INVENTION

Many well-defined mechanical devices are available for use in vehicle propulsion. Some, however, do not lend themselves to use in-present day drive train design, because vehicle speed is controlled by engine speed, vehicle speed being directly related to engine speed by the mechanical transmission which adjusts the gear ratio between the driving wheels and the engine to the best value for the torque/speed requirement. Decoupling vehicle speed (wheel RPM) from engine speed permits the use of constant speed engines or even variable speed engines where engine speed is determined by factors other than vehicle speed such as power demand.

Historically, it has been demonstrated that vehicles powered by "on-off" engines can achieve superb fuel mileage. Such engines comprise one or more cylinders which can separately operate in one of two selectable states: either at a predetermined "on" speed (typically corresponding to the most efficient operating speed of the engine and termed its "on" mode) or at an "off," or zero, speed (termed its "off" mode). Shell Oil Company has sponsored mileage contests for years. In 1977 (See Popular Science, December 1977, page 100) an entry by Cranfield Institute of Technology achieved 914 miles on one gallon of gasoline by careful management of the vehicle speed i.e. speeding up, coasting (engine off), speeding up, coasting, etc. throughout the race. Even though this demonstrates good energy management, this technique of driving would be totally unacceptable to the driving public.

Considerable energy is lost in heat dissipation every time a vehicle is brought to a stop. Regenerative braking has been in use for years in railway cars where the electric drive system permits the reclamation of some of the kinetic energy by pumping it back into the supply system. This method is impractical for single vehicles isolated from a large energy system; however, other well known short term storage devices such as the flywheel are available for use in energy storage. To take advantage of short term storage i.e. the flywheel, and prime power sources such as the "on-off" engine, a means of controlling vehicle speed other than by engine speed must be used. A transmission capable of coupling the energy from the power source to the drive wheels so that the torque and wheel speed requirement is met is needed. Many forms of variable speed transmissions are available that might fill this need but the well known Ward-Leonard system which uses a D.C. generator and a D.C. motor provides excellent speed control of the motor while the generator can be either a fixed speed or variable speed and not related to the motor speed.

A judicious combination of the best qualities of available technology can provide a system that is capable of greatly improved efficiency.

SUMMARY OF THE INVENTION

A broad objective of the present invention is to provide an efficient means to power a vehicle by minimizing fuel consumption and reclaiming energy normally lost. More particularly, the object of the present invention is to provide a drive system for a road vehicle that will deliver acceleration, deceleration, cruising and hill climbing performance typical of present day vehicles so that no performance is sacrificed while obtaining improved efficiency.

The present invention provides a variable speed piston engine as the prime source, its output power being based on demand; a high inertia acyclic D.C. generator where the rotor inertia serves as a flywheel to provide a steadying influence on the engine and to store reclaimed braking energy; a suitably sized D.C. motor to convert the available electrical power from the generator into torque to move the vehicle drive wheels; and a Ward-Leonard control system where the generator and motor in combination provide a bidirectional, variable speed transmission capable of complete speed control of the vehicle.

It is accordingly a primary object of the present invention to provide a variable speed vehicle drive system comprising: (i) a generator having a relatively high inertia rotor, the generator coupled to an on-off source of mechanical energy, the generator converting the mechanical energy into electrical energy, the rotor storing the mechanical energy when the on-off source is on and releasing the mechanical energy when the on-off source is off, (ii) a motor coupled to a drive member on the vehicle, the motor receiving the electrical energy from the generator and (iii) means for storing mechanical energy recovered from the drive member during braking of the vehicle in the rotor.

Another object of the present invention is to provide a variable speed vehicle drive system wherein the on-off power source is a piston engine.

A further object of the present invention is to provide a variable speed vehicle drive system wherein the generator is a D.C. acyclic generator.

Yet another object of the present invention is to provide a variable speed vehicle drive system wherein the rotor acts as a flywheel.

Still a further object of the present invention is to provide a variable speed vehicle drive system wherein the motor is a high torque motor.

Yet a further object of the present invention is to provide a variable speed vehicle drive system wherein the generator and the motor cooperate to form a Ward-Leonard system.

Still another object of the present invention is to provide a variable speed vehicle drive system wherein the motor is coupled to the drive member through a reducing gear.

Another object of the present invention is to provide a variable speed vehicle drive system wherein the drive member is a wheel.

Yet another object of the present invention is to provide a variable speed vehicle drive system wherein the storing means is a regenerative braking system.

Still a further object of the present invention is to provide a variable speed vehicle drive system wherein a rated full-load speed of the on-off source is between 30 and 50 percent of a no-load speed of the on-off source.

Yet a further object of the present invention is to provide a variable speed vehicle drive system wherein an upper limit speed of the on-off source is between 150 and 160 percent of a no-load speed of the on-off source.

Still another object of the present invention is to provide a variable speed vehicle drive system wherein the rotor can store sufficient energy to accelerate the vehicle from rest to 60 miles per hour.

And another object of the present invention is to provide a variable speed vehicle drive system wherein the on-off source supplies mechanical energy to the generator only when a rotational speed of the rotor drops below a predetermined minimum speed.

The foregoing has outlined rather broadly the features and technical advantages of the present invention that the detailed description of the present invention that follows may be better understood. Additional features and advantages of the present invention will be described hereinafter which form the subject of the claims of the present invention. Those skilled in the art should appreciate that the conception and the specific embodiment disclosed may be readily utilized as a basis for modifying or designing other structures for carrying out the same purposes of the present invention. Those skilled in the art should also realize that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
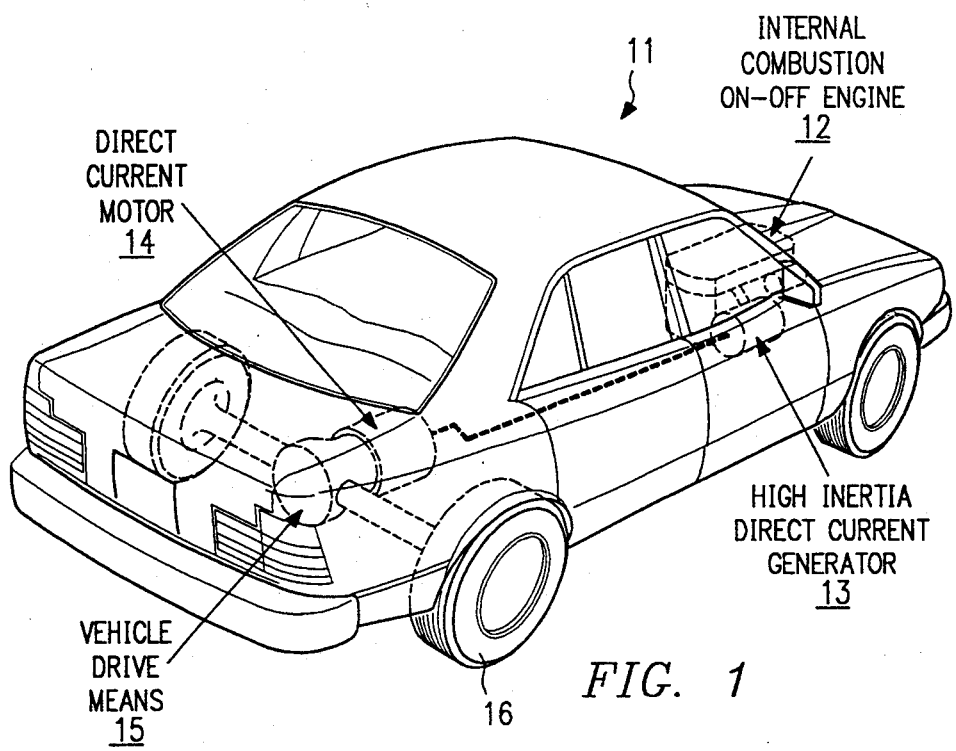
FIG. 1 is a representational block diagram of the general concept of the present invention.

The present invention may generally be understood from FIG. 1 as comprising a vehicle 11 powered by a variable speed "on-off" piston engine 12 connected to a high inertia acyclic D.C. generator 13 that is used to extract mechanical power from the engine 12. The high inertia of a rotor (not shown) within the generator 13 serves as an energy storage flywheel. The rotor's weight, configuration and rotational speed are determined by the required electrical output power for driving the vehicle 11 and the intermittent storage capacity needed to absorb the energy normally lost in braking. The engine 12 and the rotor/flywheel within the generator 13 cooperate to provide mechanical power to enable the generator 13 to produce electrical power. The rotational energy available from the engine-flywheel source is thereby converted into electrical energy and transmitted to a D.C. motor 14, which receives electrical power from the generator 13 and produces mechanical power therefrom, transmitting that mechanical power to driving wheels 16 by a conventional drive means 15, which may comprise a mechanical, hydraulic, pneumatic or hybrid transmission. The generator 13 and motor 14 cooperate to provide a Ward-Leonard system, which is well known and understood in the prior art as having excellent speed control characteristics, the system being able to accurately control motor 14 speed over a range of zero to several thousand RPM. This speed control system is required for operating the vehicle drive means 15 since, at certain times, the engine-flywheel power source will be decreasing in rotational speed as the drive wheels 16 are increasing in rotational speed in distinction to conventional propulsion systems where the engine speed increases as the speed of the vehicle increases.

The energy E stored in a flywheel when accelerating, and delivered when the flywheel decelerating, is given by the equation:

$$E = 0.5m(V_1^2 - V_2^2)$$

where $V_1$ is the initial and $V_2$ is the final speed of the rim and m is the mass of the rim. The maximum rim speed of a flywheel is governed by the tensile strength of the material as well as the design of the flywheel. For steel, the limitation is approximately 27,000 feet per minute.

Figure 2:
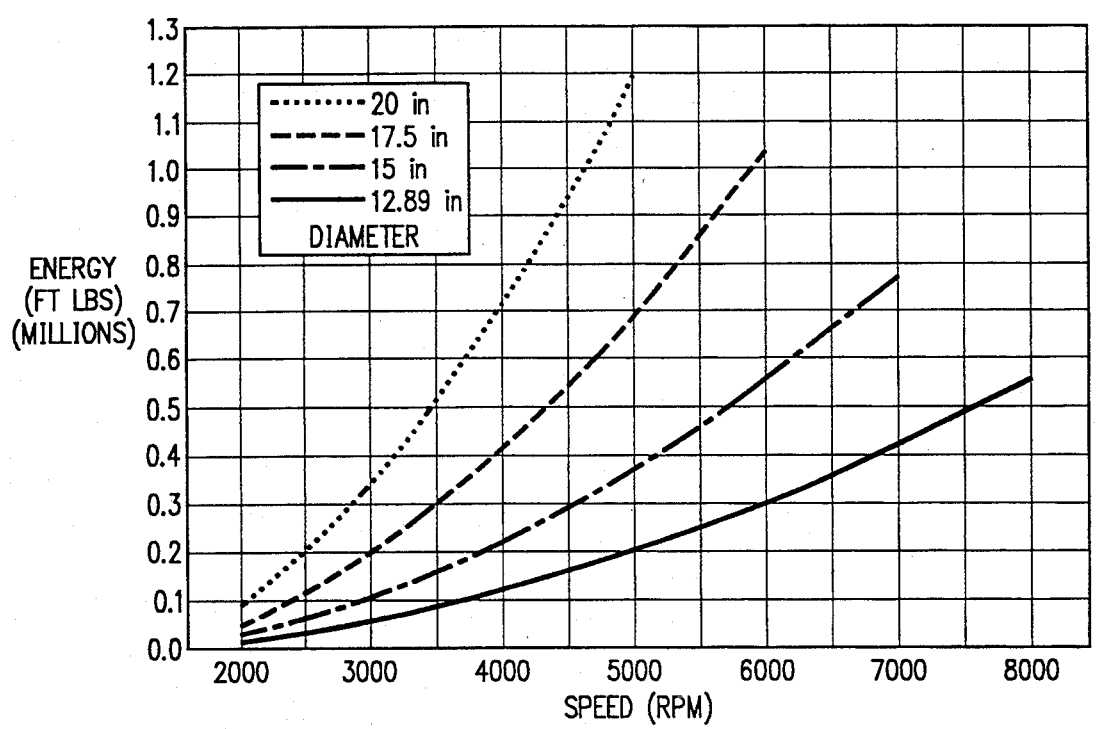
FIG. 2 illustrates the energy available from a particular cylindrical flywheel with different diameters.

Turning now to FIG. 2, shown are a plurality of kinetic energy curves representing the capability of a cylindrical steel flywheel 10 inches in length and with diameters varying from 20 inches down to 12.89 inches. Each curve stops at the limiting rim speed.

Figure 3:
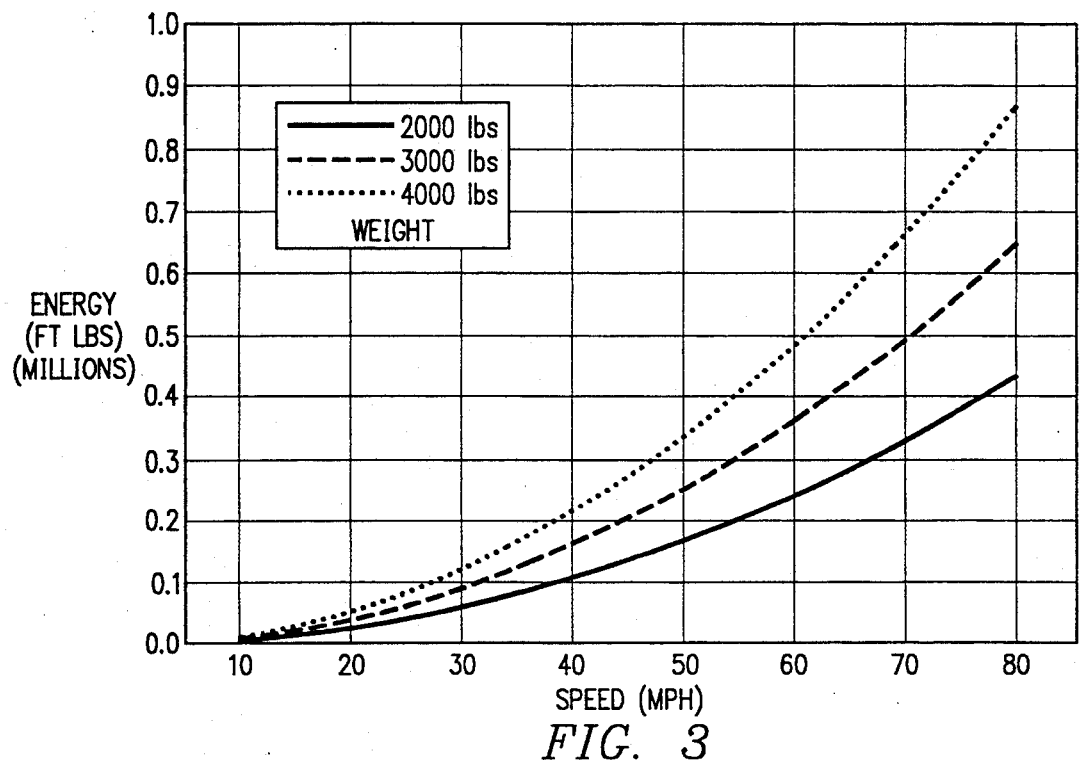
FIG. 3 illustrates the kinetic energy possessed by a moving vehicle of three different weights across a speed spectrum of 80 MPH.

Turning now to FIG. 3, illustrated is the kinetic energy possessed by a moving vehicle that weighs between 2000 and 4000 pounds and at velocities ranging from 0 to 80 MPH. Note that at 60 MPH, a 3000 pound vehicle possesses approximately 360,000 foot pounds of energy and that 360,000 foot pounds of energy is available from a 17.5 inch diameter flywheel initially turning at 3800 RPM and slowing to 1500 RPM.

In the present invention, the propulsion characteristics of the "on-off" engine 12 are matched to the characteristics of the high inertia rotor of the acyclic generator 13 since the rotor also serves as the flywheel. When the generator 13 is operating at approximately 3800 RPM, the speed at which 360,000 foot pounds of energy is stored, the engine 12 is "off" (free wheeling). As the generator rotor slows, the engine begins to fire depending on the speed as illustrated in FIG. 4.

Most "on-off" engines i.e. stationary engines, have been conventionally designed as one cylinder engines with fuel intake controlled by a governor. The present invention, in its preferred embodiment, uses an "on-off" engine 12 having multiple cylinders (preferably 4 or more) to achieve greater power and smoother operation.

Figure 4A:
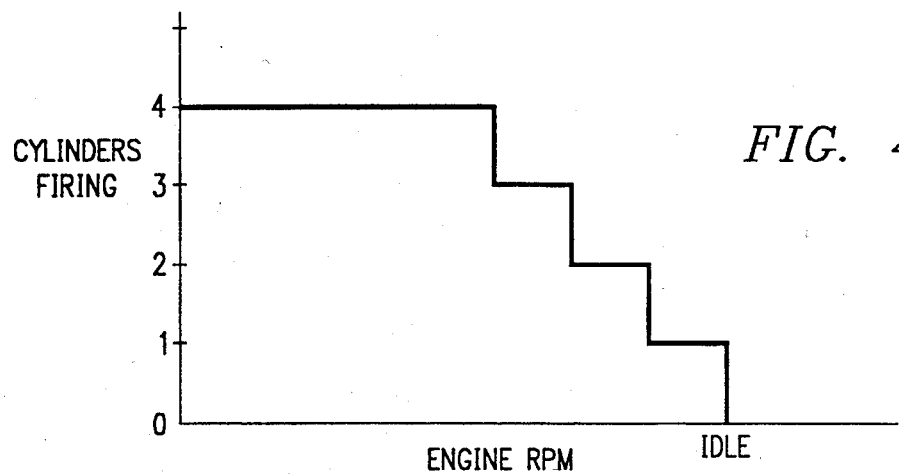
FIG. 4a illustrates the "on-off" characteristic of the cylinders firing of the prime power source as the speed varies.
Figure 4B:
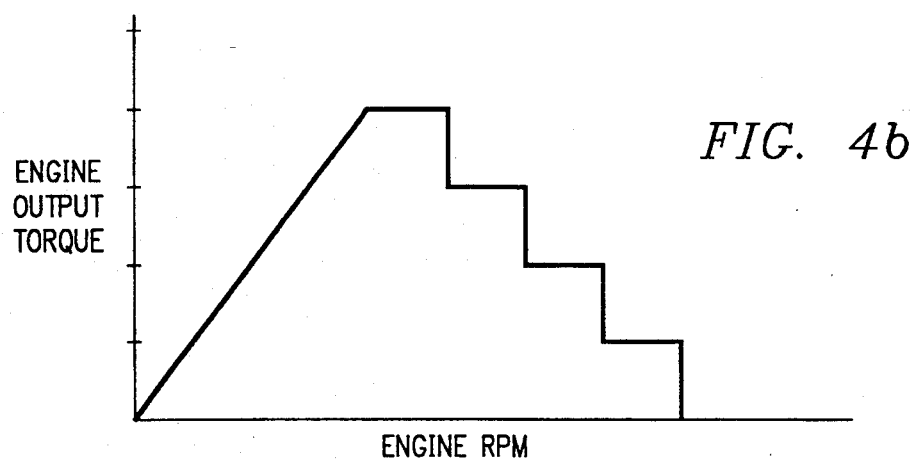
FIG. 4b illustrates engine output torque as engine speed varies.
Figure 4C:
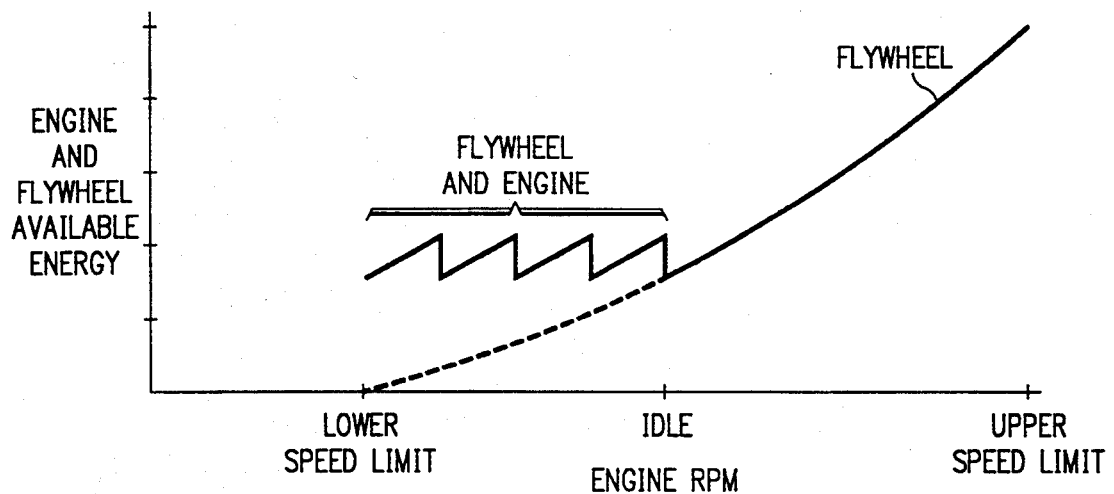
FIG. 4c illustrates engine and flywheel energy as engine speed varies.

Turning now to FIG. 4, illustrated is a power demand approach employed in the preferred embodiment of the present invention in controlling the "on-off" engine 12. On starting the engine, all cylinders fire to accelerate the engine. As engine RPM increases, cylinders will cease firing one by one until the engine reaches a desired idle speed. At this speed (approximately 3800

RPM in the preferred embodiment) all cylinders will have ceased firing. As the speed slows, one cylinder will fire occasionally to overcome internal losses while engine speed is maintained steady by the flywheel nature of the rotor.

As the vehicle begins to move and power is required, the engine-flywheel-generator begins to slow as the flywheel gives up energy. If power demand persists, the engine will continue to slow and, one by one, the cylinders will start firing until all are firing. Driving demands vary widely depending on whether acceleration or braking is required. Once the vehicle speed has been established on level terrain, the power required to overcome windage and road friction becomes a fraction of that required to accelerate and the number of firing cylinders decreases until equilibrium is reached.

Figure 5:
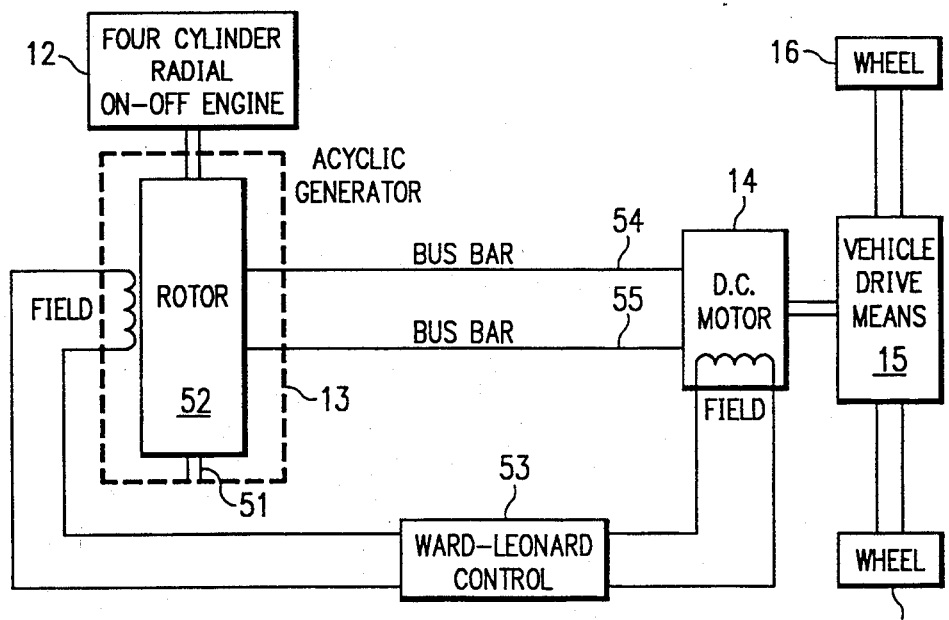
FIG. 5 is a schematic illustration of one embodiment of the present invention illustrating aspects of FIG. 1 in more detail.

Turning now to, FIG. 5 shown in more detail is the drive system of the present invention. The engine 12/generator 13 combination is preferably installed with its rotational axis 51 vertical in the vehicle engine compartment (not shown) so as to minimize gyroscopic moments when the vehicle is turning. To accommodate this configuration, the engine 12 is preferably of a radial design so as to minimize length and the generator 13 is preferably of an acyclic design so as to minimize weight and provide a solid rotor 52 to provide the flywheel feature. This type of generator 13 has been marketed for years by electrical manufacturers and is ideally suited to this application. The acyclic generator 13 produces pure direct current at a relatively low voltage but with high current capacity so that the required power can be delivered to the load via bus bars 54, 55. The D.C. motor 14 can be of any configuration suitably sized to deliver the required power for vehicle acceleration which should correspond to the largest demand the vehicle can be expected to make of its drive system.

The vehicle drive means 15 is of conventional design and may comprise, for example, a conventional differential and rear axle assembly. However, two motors 14, with appropriate gear reduction, can be used to drive the vehicle wheels 16 thus eliminating the need for a differential. The generator 13 and motor 14 cooperate to form a Ward-Leonard system, which, in the preferred embodiment of the present invention, is placed under control of a Ward-Leonard control 53. The control 53 is a straightforward, conventional electrical design that provides field control of both the generator and the motor so that the desired speed/torque characteristic for acceleration is generated and the desired speed/torque characteristic for braking is generated.

In the preferred embodiment of the present invention, energy normally lost during braking of the vehicle is recovered and stored in the rotor 52 in the form of additional rotational kinetic energy. Recovery and storage (termed "regeneration") can occur by one of several means. As illustrated in FIG. 5, motor 14 can convert mechanical energy present in the inertia of the vehicle into electrical energy by operating the motor 14 as a generator. The generator 13 can likewise be operated as a motor to convert the electrical energy delivered to the generator 13 via the bus bars 54, 55 into mechanical energy, to be stored in the rotor 52. Alternatively, mechanical, hydraulic or pneumatic systems of conventional design can be employed to couple the drive wheels 16 to the rotor 52 to recover energy therefrom during braking.

To accelerate a 3000 pound vehicle at 8.8 feet per second requires 820 pounds of force applied to the vehicle. Application for 10 seconds to achieve 88 feet per second requires 131 horsepower. To climb a 10 degree slope requires 83 horsepower. To cruise at 60 MPH, requires a force of approximately 100 to 150 pounds to overcome aerodynamic drag and road friction. This equates to a horsepower requirement of 24. The engine is sized to handle the hill climbing requirement with all cylinders firing. Thus each cylinder must deliver 20 to 25 horsepower when firing and must provide minimum holdback when not firing.

Figure 6:
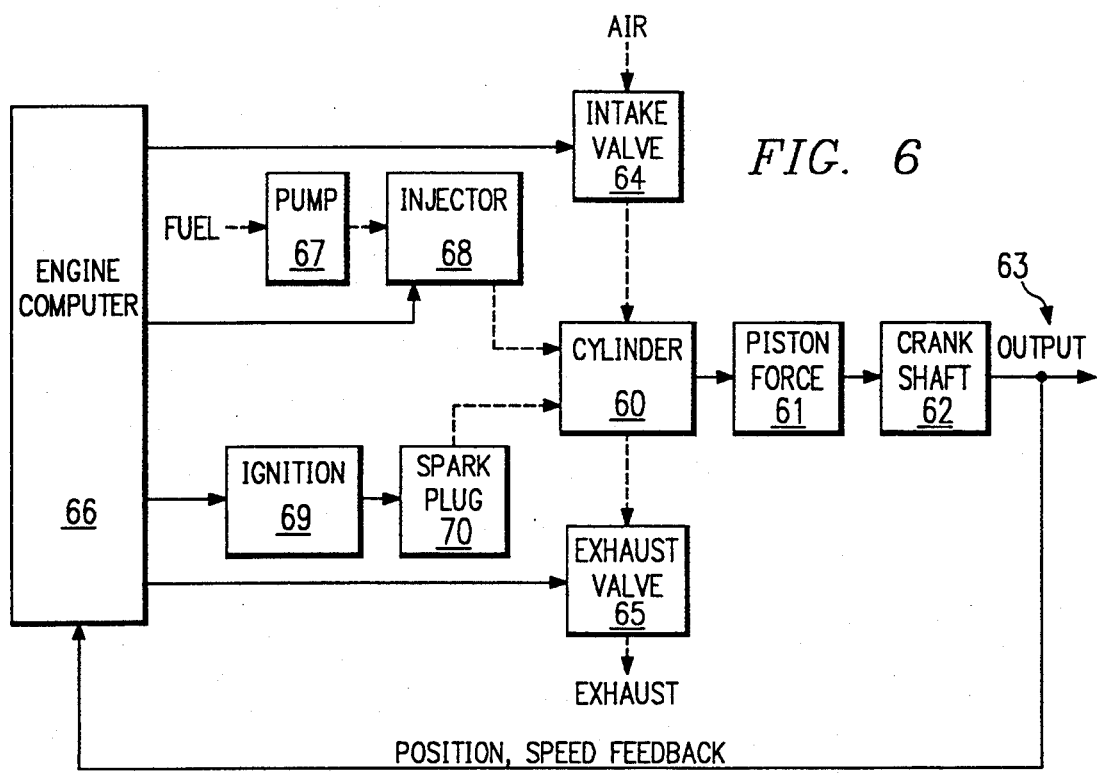
FIG. 6 is a block diagram of one cylinder of the on-off engine and controls.

Turning now to FIG. 6, illustrated in block diagram form is an "on-off" engine for a drive train constructed in accordance with the present invention. For purposes of FIG. 6 the "on-off" engine has only one cylinder. The piston engine consists of four cylinders 60 that provide torque to an output shaft 63 through a crankshaft 62 using four pistons 61. The intake valves 64 and exhaust valves 65 are controlled by engine computer 66. Fuel is fed to the engine by a fuel pump 67 supplying fuel to a computer controlled injection system 68. The ignition system 69 supplies high voltage to the spark plugs 70. In the "on" mode, the computer opens valves, closes valves, injects fuel and supplies spark plug voltage as in any four stroke engine with the throttle open. In the "off" mode, the computer inhibits fuel injection and ignition and re-times the valves to pump air without compression so as to minimize the engine drag on the output shaft.

When the maximum rim speed of the generator rotor is approached when in the braking mode and storing energy by increasing the speed of the rotor, the computer will re-time the valves to cause compression so that the engine can begin holding back to limit rotational speed.

Figure 7:
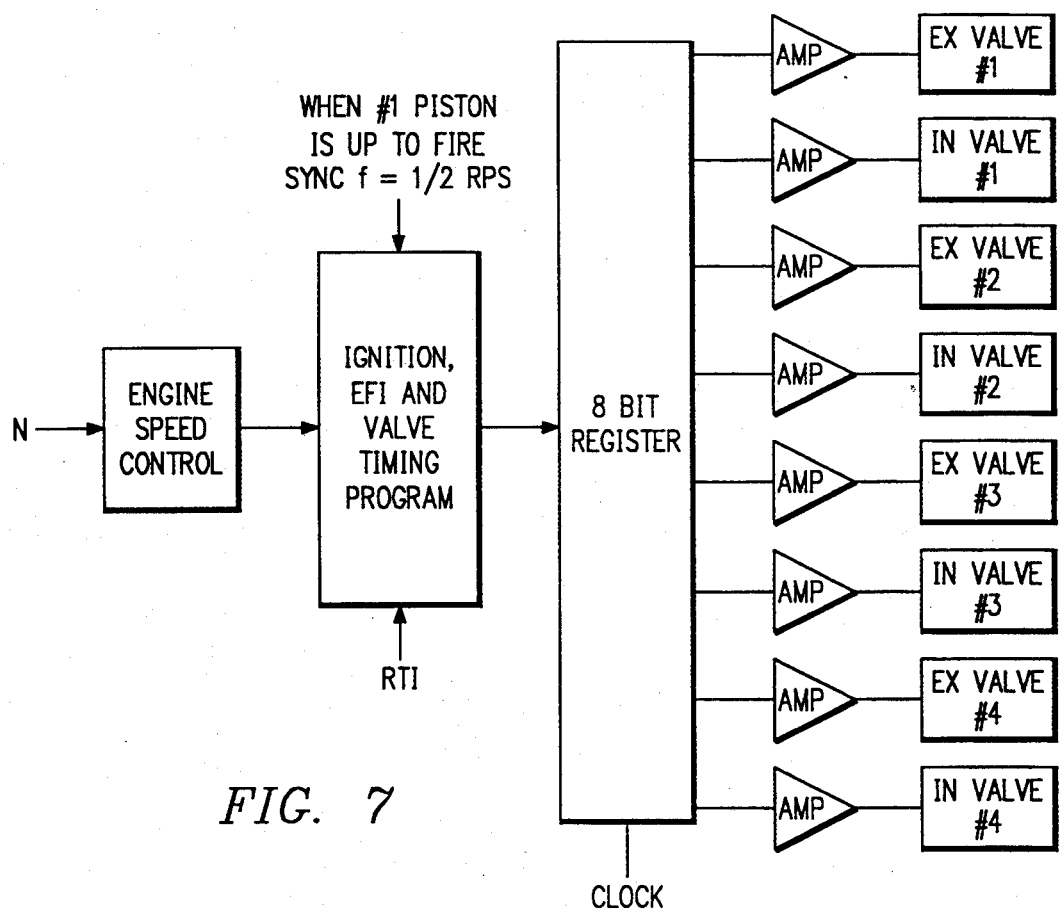
FIG. 7 illustrates the valve control system for the prime power source.

FIG. 7 illustrates in block diagram form the computational elements required to provide valve control. The generator and drive motor provide the means for speed control and decoupling of vehicle speed from engine speed. As previously described, the method used is the Ward-Leonard method which has been used for many years to provide excellent speed control. The generator field is controlled to provide a variable voltage to the drive motor. This voltage can easily be reversed when it is required to move the vehicle in the opposite direction. By proper control of the drive motor field, the desired torque/speed can be provided to the drive wheels. Regenerative braking is provided by reducing the generator voltage while maintaining the drive motor field. Thus the drive motor acts as a generator and the generator is driven as a motor which causes the rotor to increase in speed thereby storing the braking energy.

Although the present invention and its advantages have been described in detail, it should be understood that various changes, substitutions and alterations can be made herein without departing from the spirit and scope of the invention as defined by the appended claims.

Specifically, the engine does not need to be a piston engine, but can, instead, be a rotary engine or thermal cycle engine. The generator can be of any design, and the rotor need not act as the flywheel. Thus the flywheel can be separate from the generator. The motor can be of any conventional design and can be used alone or in combination with other motors.

What is claimed is:

1. A variable speed vehicle drive system, comprising:

a generator having a relatively high inertia rotor, said generator coupled to an on-off internal combustion engine providing mechanical energy, said generator converting said mechanical energy into electrical energy, said rotor storing said mechanical energy when said on-off internal combustion engine is on and releasing said mechanical energy when said on-off internal combustion engine is off;

a motor coupled to a drive member on said vehicle, said motor receiving said electrical energy from said generator; and means for storing mechanical energy recovered from said drive member during braking of said vehicle in said rotor.

2. The system as recited in claim 1 wherein said on-off internal combustion engine is a piston engine.

3. The system as recited in claim 1 wherein said generator is a D.C. acyclic generator.

4. The system as recited in claim 1 wherein said rotor acts as a flywheel.

5. The system as recited in claim 1 wherein said motor is a high torque motor.

6. The system as recited in claim 1 wherein said generator and said motor cooperate to form a Ward-Leonard system, wherein a field of said generator is controlled to provide a variable voltage to said motor, said variable voltage providing bidirectional speed control of said motor, and wherein a field of said drive motor is used for storing said mechanical energy in said rotor during said braking of said vehicle.

7. The system as recited in claim 1 wherein said motor is coupled to said drive member through a reducing gear.

8. The system as recited in claim 1 wherein said drive member is a wheel.

9. The system as recited in claim 1 wherein said storing means is a regenerative braking system.

10. The system as recited in claim 1 wherein said on-off internal combustion engine has a rated full-load speed and a no-load speed wherein said rated full-load speed of said on-off internal combustion engine is between 30 and 50 percent of said no-load speed of said on-off internal combustion engine.

11. The system as recited in claim 1 wherein said on-off internal combustion engine has an upper limit speed and a no-load speed wherein said upper limit speed of said on-off internal combustion engine is between 150 and 160 percent of said no-load speed of said on-off internal combustion engine.

12. The system as recited in claim 1 wherein said rotor has sufficient mass to store sufficient energy to accelerate said vehicle from rest to 60 miles per hour.

13. The system as recited in claim 1 wherein said on-off source supplies mechanical energy to said generator only when a rotational speed of said rotor drops below a predetermined minimum speed.

14. A method of driving a vehicle at variable speed, comprising the steps of:

providing mechanical energy from an on-off internal combustion engine to a generator having a relatively high inertia rotor, said generator converting said mechanical energy into electrical energy, said rotor storing said mechanical energy when said on-off internal combustion engine is on and releasing said mechanical energy when said on-off internal combustion engine is off;

providing mechanical energy from a motor to a drive member on said vehicle, said motor receiving said electrical energy from said generator; and storing mechanical energy recovered from said drive member during braking of said vehicle in said rotor.

15. The method as recited in claim 14 wherein said step of converting said mechanical energy into said electrical energy comprises the step of converting said mechanical energy into said electrical energy with a D.C. acyclic generator.

16. The method as recited in claim 14 wherein said step of storing said mechanical energy when said on-off source is on and releasing said mechanical energy when said on-off source is off comprises the step of storing said mechanical energy when said on-off source is on and releasing said mechanical energy when said on-off source is off in said rotor which acts as a flywheel.

17. The method as recited in claim 14 wherein said step of providing mechanical energy from a motor to a drive member comprises the step of providing mechanical energy from a motor to a drive member with a high torque motor.

18. The method as recited in claim 14 including the step of controlling said generator and said motor with a Ward-Leonard controller such that said generator and said motor cooperate to form a Ward Leonard system, wherein a field of said generator is controlled to provide a variable voltage to said motor, said variable voltage providing bidirectional speed control of said motor, and wherein a field of said drive motor is used for storing said mechanical energy in said rotor during said braking of said vehicle.

19. The method as recited in claim 14 including the step of coupling said motor to said drive member through a reducing gear.

* * * * *